US010705849B2

(12) United States Patent
Mirhosseininiri et al.

(10) Patent No.: US 10,705,849 B2
(45) Date of Patent: Jul. 7, 2020

(54) MODE-SELECTABLE PROCESSOR FOR EXECUTION OF A SINGLE THREAD IN A FIRST MODE AND PLURAL BORROWED THREADS IN A SECOND MODE

(71) Applicant: The Regents of The University of Michigan, Ann Arbor, MI (US)

(72) Inventors: Seyedamirhossein Mirhosseininiri, Ann Arbor, MI (US); Thomas Friedrich Wenisch, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 69 days.

(21) Appl. No.: 15/888,359

(22) Filed: Feb. 5, 2018

(65) Prior Publication Data

US 2019/0243654 A1    Aug. 8, 2019

(51) Int. Cl.
*G06F 9/30* (2018.01)
*G06F 9/50* (2006.01)
*G06F 9/38* (2018.01)
*G06F 9/48* (2006.01)
*G06F 12/0804* (2016.01)
*G06F 12/1027* (2016.01)

(52) U.S. Cl.
CPC .......... *G06F 9/3851* (2013.01); *G06F 9/3877* (2013.01); *G06F 9/4843* (2013.01); *G06F 9/5016* (2013.01); *G06F 12/0804* (2013.01); *G06F 12/1027* (2013.01); *G06F 2212/1008* (2013.01); *G06F 2212/62* (2013.01)

(58) Field of Classification Search
CPC ........ G06F 9/3851; G06F 9/3877; G06F 9/46; G06F 9/5016
See application file for complete search history.

(56) References Cited

U.S. PATENT DOCUMENTS

| 6,418,460 B1 * | 7/2002 | Bitar ....................... G06F 9/462 712/233 |
| 6,658,449 B1 * | 12/2003 | Brenner ................ G06F 9/5088 709/201 |
| 6,779,182 B1 * | 8/2004 | Zolnowsky ........... G06F 9/4843 709/203 |
| 8,161,482 B1 * | 4/2012 | Sakarda ................ G06F 9/5027 718/102 |

(Continued)

OTHER PUBLICATIONS

L. Barroso et al, "Attack of the Killer Microseconds" *Communications of the ACM*, vol. 60, No. 4, Apr. 2017, pp. 48-54.

(Continued)

*Primary Examiner* — David J. Huisman
(74) *Attorney, Agent, or Firm* — Nixon & Vanderhye P.C.

(57) ABSTRACT

A data processing system includes a multithreaded processor to execute a plurality of selected program threads in parallel. A mode-selectable processor is coupled to the multithreaded processor and executes in either a first mode or a second mode. In the first mode program instructions from a single thread are executed. In the second mode, which is selected when the single program thread is inactive, program instructions forming a plurality of borrowed threads are executed. These borrowed threads are taken from a queue of candidate program threads which is managed by the multithreaded processor.

20 Claims, 6 Drawing Sheets

(56) References Cited

U.S. PATENT DOCUMENTS

| | | | | |
|---|---|---|---|---|
| 2005/0210472 | A1* | 9/2005 | Accapadi | G06F 9/5033 718/105 |
| 2006/0123423 | A1* | 6/2006 | Brenner | G06F 9/5083 718/105 |
| 2016/0154677 | A1* | 6/2016 | Barik | G06F 13/4239 718/105 |
| 2017/0322830 | A1* | 11/2017 | Tamura | G06F 9/4806 |

OTHER PUBLICATIONS

X. Wu et al, "SCMFS : A File System for Storage Class Memory" *Proceedings of 2011 International Conference for High Performance Computing, Networking, Storage and Analysis*, Nov. 12-18, 2011, 11 pages.

J. Condit et al, "Better I/O Through Byte-Addressable, Persistent Memory" *Proceedings of the ACM SIGOPS $22^{nd}$ symposium on operating systems principles*, Oct. 11-14, 2009, 14 pages.

S.R. Dulloor et al, "System Software for Persistent Memory" *Proceedings of the Ninth European Conference on Computer Systems*, Apr. 13-16, 2-14, 15 pages.

N. Agarwal et al, "Thermostat: Application-transparent Page Management for Two-tiered Main Memory" *Proceedings of the Twenty-Second International Conference on Architectural Support for Programming Languages and Operating Systems*, Apr. 8-12, 2017, 14 pages.

J. Corbet, "AutoNUMA: the other approach to NUMA scheduling" https://lwn.net/Articles/488709/, Mar. 27, 2012, 4 pages.

S. Kannan et al, "pVM—Persistent Virtual Memory for Efficient Capacity Scaling and Object Storage" *Proceedings of the Eleventh European Conference on Computer Systems*, Apr. 18-21, 2016, 16 pages.

K. Lim et al, "Disaggregated Memory for Expansion and Sharing in Blade Servers" *ACM SIGARCH Computer Architecture News*, vol. 37, Jun. 20-24, 2009, pp. 1-12.

A. Dragojevic et al, "FaRM: Fast Remote Memory" *Proceedings of the $11^{th}$ USENIX Conference on Networked Systems Design and Implementation*, Apr. 2-4, 2014, 15 pages.

S. Novakovic et al, "Scale-Out NUMA" *ACM SIGPLAN Notices*, vol. 49, Mar. 2014, 15 pages.

J. Gu et al, "Efficient Memory Disaggregation with INFINISWAP" *$14^{th}$ USENIX Symposium on Networked Systems Design and Implementation NSDI*, Mar. 27-29, 2017, 21 pages.

S. Novakovic, "The Case for RackOut: Scalable Data Serving Using Rack-Scale Systems" *Proceedings of the 2016 ACM Symposium on Cloud Computing*, Oct. 5-7, 2016, 14 pages.

N. Zilberman et al, "NetFPGA SUME: Toward Research Commodity 100Gb/s" *IEEE Micro*, vol. 34, No. 5, Jul. 25, 2014, pp. 1-7.

C. Li et al, "Quantifying the Cost of Context Switch" *Proceedings of the 2007 Workshop on Experimental Computer Science*, Jun. 13-14, 2007, pp. 1-4.

D. Tsafrir, "The Context-Switch Overhead Inflicted by Hardware Interrupts (and the Enigma of Do-Nothing Loops)" *Proceedings of the 2007 Workshop on Experimental Computer Science*, Jun. 13-14, 2007, pp. 1-14.

D. Lo et al, "Heracles: Improving Resource Efficiency at Scale" *ACM SIGARCH Computer Architecture News*, Jun. 13-17, 2015, 13 pages.

C. Delimitrou et al, "Quasar: Resource-Efficient and QoS-Aware Cluster Management" *ACM SIGPLAN Notices*, Mar. 1-5, 2014, 17 pages.

H. Yang et al, "Bubble-Flux: Precise Online QoS Management for Increased Utilization in Warehouse Scale Computers" *ACM SIGARCH Computer Architecture News*, Aug. 12, 2013, 12 pages.

Y. Zhang et al, "SMiTe: Precise QoS Prediction on Real-System SMT Processors to Improve Utilization in Warehouse Scale Computers" *Proceedings of the $47^{th}$ Annual IEEE/ACM International Symposium on Microarchitecture*, Dec. 13-17, 2014, pp. 406-418.

X. Yang et al, "Elfen Scheduling: Fine-Grain Principled Borrowing from Latency-Critical Workloads using Simultaneous Multithreading" *Proceedings of the 2016 USENIX Annual Technical Conference*, Jun. 22-24, 2016, pp. 1-14.

Khubaib et al, "MorphCore: An Energy-Efficient Microarchitecture for High Performance ILP and High Throughput TLP" *2012 IEEE/ACM $45^{th}$ Annual International Symposium on Microarchitecture*, Dec. 1-5, 2012, pp. 305-316.

E. Tune et al, "Balanced Multithreading: Increasing Throughput via a Low Cost Multithreading Hierarchy" *Proceedings of the $37^{th}$ International Symposium on Microarchitecture (MICRO-37 2004)*, Dec. 2004, 12 pages.

A. Klimovic et al, "ReFlex: Remote Flash Local Flash" *Proceedings of the Twenty-Second International Conference on Architectural Support for Programming Languages and Operating Systems*, Apr. 8-12, 2017, 15 pages.

Intel Corporation, "3D XPoint™: A Breakthrough in Non-Volatile Memory Technology" retrieved at https://www.intel.com/content/www/us/en/architecture-and-technology/intel-micron-3d-xpoint-webcast.html on May 3, 2018, 5 pages.

O. Mutlu et al, "Runahead Execution: An Alternative to Very Large Instruction Windows for Out-of-order Processors" *Proceedings, The Ninth International Symposium on High-Performance Computer Architecture*, Feb. 12, 2003, 12 pages.

A. Belay et al, "IX: A Protected Dataplane Operating System for High Throughput and Low Latency" *Proceedings of the $11^{th}$ USENIX Symposium on Operating Systems Designs and Implementation*, Oct. 6-8, 2014, 18 pages.

P. Rogers et al, "Heterogeneous System Architecture Overview" in *Hot Chips*, vol. 25, Aug. 2013, 41 pages.

D. Meisner et al, "PowerNap: Eliminating Server Idle Power" *ACM Sigplan Notices, ASPLOS'09*, Mar. 7-11, 2009, 12 pages.

L.A. Barroso et al, "Web Search for a Planet: The Google Cluster Architecture" *IEEE Micro*, vol. 23, No. 2, Mar.-Apr. 2003, pp. 22-28.

J. Dean et al, "The Tail at Scale" *Communications of the ACM*, vol. 56, No. 2, Feb. 2013, pp. 74-80.

D. Meisner et al, "Power Management of Online Data-Intensive Services" *2011 $38^{th}$ Annual International Symposium on Computer Architecture ISCA'11*, Jun. 4-8, 2011, 12 pages.

S. Kanev et al, "Profiling a warehouse-scale computer" *2015 ACM/IEEE $42^{nd}$ Annual International Symposium on Computer Architecture (ISCA)*, Jun. 13-17, 2015, 12 pages.

J. Zawodny, "Redis: Lightweight key/value Store That goes the Extra Mile" *Linux Magazine*, vol. 79, Aug. 31, 2009, 7 pages F.M. Sleiman et al, "Efficiently Scaling Out-of-Order Cores for Simultaneous Multithreading" *2016 ACM/IEEE $43^{rd}$ Annual International Symposium on Computer Architecture*, Jun. 18-22, 2016, pp. 431-443.

S. Hily et al, "Out-Of-Order Execution May Not Be Cost-Effective on Processors Featuring Simultaneous Multithreading" *Proceedings, Fifth International Symposium on High-Performance Computer Architecture*, Feb. 1999, pp. 1-4.

S. Li et al, "McPAT: An Integrated Power, Area, and Timing Modeling Framework for Multicore and Manycore Architectures" *MICRO-42 $42^{nd}$ Annual IEEE/ACM International Symposium on Microarchitecture*, Dec. 12-16, 2009, 12 pages Z. Mwaikambo et al, "Linux Kernel Hotplug CPU Support" *Linux Symposium 2004*, vol. 2, 2004, Jul. 21-24, 2004, 16 pages.

G. Zellweger et al, "Decoupling Cores, Kernels, and Operating Systems" *Proceedings of the $11^{th}$ USENIX Symposium on Operating Systems Design and Implementation (OSDI '14)*, Oct. 6-8, 2014, 16 pages.

C. Delimitrou et al, "Paragon: QoS-Aware Scheduling for Heterogeneous Datacenters" in *ACM SIGPLAN Notices*, vol. 48, Mar. 2013, pp. 77-88.

Z. Chishti et al, "Optimal Power/Performance Pipeline Depth for SMT in Scaled Technologies" *IEEE Transactions on Computers*, vol. 57, No. 1, Jan. 2008, pp. 69-81.

N. Binkert et al, "The gem5 Simulator" *ACM SIGARCH Computer Architecture News*, vol. 39, No. 2, pp. 1-7, May 2011.

(56) References Cited

OTHER PUBLICATIONS

S. Eyerman et al, "Probabilistic Job Symbiosis Modeling for SMT Processor Scheduling" *ACM Sigplan Notices*, vol. 45, No. 3, Mar. 2010, pp. 91-102.
M. Ferdman, "Clearing the Clouds: A Study of Emerging Scale-out Workloads on Modern Hardware" *Proceedings of the 17th Conference on Architectural Support for Programming Languages and Operating Systems (ASPLOS 2012)*, Mar. 3-7, 2012, pp. 1-11.
H. Kasture et al, "TailBench: A Benchmark Suite and Evaluation Methodology for Latency-Critical Applications" *Proceedings of the 2016 IEEE International Symposium on Workload Characterization (IISWC)*, Sep. 25-27, 2016, pp. 1-10.
M. Muja et al, "Scalable Nearest Neighbor Algorithms for High Dimensional Data" *IEEE Transactions on Pattern Analysis and Machine Intelligence*, vol. 36, No. X, May 1, 2014, pp. 1-14.
H. Kasture et al, "Ubik: Efficient Cache Sharing with Strict QoS for Latency-Critical Workloads" *ASPLOS'14*, Mar. 1-4, 2014, pp. 1-14.
H. Kasture et al, "Rubik: Fast Analytical Power Management for Latency-Critical Systems" *MICRO-48*, Dec. 5-9, 2015, pp. 1-13.
D. Sanchez et al, "Vantage: Scalable and Efficient Fine-Grain Cache Partitioning" *ISCA'11*, Jun. 4-8, 2011, pp. 1-12.
D. Meisner et al, "BigHouse: A simulation infrastructure for data center systems" *IEEE International Symposium on Performance Analysis of Systems and Software (ISPASS)*, Apr. 1-3, 2012, pp. 35-45.
J. Li et al, "Tales of the Tail: Hardware, OS, and Application-level Sources of Tail Latency" *SOCC'14*, Nov. 3-5, 2014, 14 pages.
D.M. Tullsen, "Exploiting Choice: Instruction Fetch and Issue on an Implementable Simultaneous Multithreading Processor" *Proceedings of the 23rd Annual International Symposium on Computer Architecture*, May 1996, 12 pages.
N. Muralimanohar et al, "CACTI 6.0: A Tool to Understand Large Caches" *HP Laboratories*, Apr. 21, 2009, 20 pages.
P. Lotfi-Kamran et al, "Scale-Out Processors" *Proceedings of the 39th Annual International Symposium on Computer Architecture*, Jun. 2012, pp. 1-11.
S. Eyerman et al, "System-Level Performance Metrics for Multiprogram Workloads" *IEEE Micro*, May-Jun. 2008, pp. 42-53.
J. Mars et al, "Bubble-Up: Increasing Utilization in Modern Warehouse Scale Computers via Sensible Co-locations" *MICRO'11*, Dec. 3-7, 2011, 12 pages.
F.J. Cazorla et al, "QoS for High-Performance SMT Processors in Embedded Systems" *IEEE Micro*, Jul.-Aug. 2004, pp. 24-31.
F.J. Cazorla et al, "Predictable Performance in SMT Processors: Synergy between the OS and SMTs" *IEEE Transactions on Computers*, vol. 55, No. 7, Jul. 2006, pp. 785-799.
A. Snavely et al, "Symbiotic Jobscheduling for a Simultaneous Multithreading Processor" *Proceedings of ASPLOS IX*, Nov. 2000, 11 pages.
A. Vega et al, "SMT-Centric Power-Aware Thread Placement in Chip Multiprocessors" *2013 22nd International Conference on Parallel Architectures and Compilation Techniques (PACT)*, Sep. 7-11, 2013, pp. 167-176.
M.K. Qureshi et al, Utility-Based Cache Partitioning: A Low-overhead, high-Performance, Runtime Mechanism to Partition Shared Caches *The 39th Annual IEEE/ACM International Symposium on Microarchitecture (MICRO'06)*, Dec. 9-13, 2006, 10 pages.
P. Ranganathan et al, "Reconfigurable Caches and their Application to Media Processing" *Proceedings of the 27th International Symposium on Computer Architecture (ISCA-27)*, Jun. 2000, 11 pages.
R. Manikantan et al, Probabilistic Shared Cache Management (PriSM), *ACM SIGARCH computer architecture news*, vol. 40, Jun. 9-13, 2012, pp. 428-439.
S. Srikantaiah et al, "Sharp Control: Controlled Shared Cache Management in Chip Multiprocessors" *MICRO'09*, Dec. 12-16, 2009, pp. 517-528.
Y. Xie et al, "PIPP: Promotion/Insertion Pseudo-Partitioning of Multi-Core Shared Caches" *ISCA'09*, Jun. 20-24, 2009, pp. 174-183.
R. Iyer et al, "QoS Policies and Architecture for Cache/Memory in CMP Platforms" *SIGMETRICS'07*, Jun. 12-16, 2007, pp. 25-36.
R. Iyer, "CQoS: A Framework for Enabling QoS in Shared Caches of CMP Platforms" *ICS'04*, Jun. 26-Jul. 1, 2004, pp. 257-266.
F. Guo et al, "A Framework for Providing Quality of Service in Chip Multi-Processors" *40th IEEE/ACM International Symposium on Microarchitecture*, Dec. 1-5, 2007, pp. 343-355.
F. Guo et al, "From Chaos to QoS: Case Studies in CMP Resource Management" *ACM SIGARCH Computer Architecture News*, vol. 35, No. 1, Mar. 2007, 10 pages.
A. Herdrich et al, "Cache QoS: From Concept to Reality in the Intel® Xeon® Processor E5-2600 v3 Product Family" *2016 IEEE International Symposium on High Performance Computer Architecture (HPCA)*, Mar. 12-16, 2016, pp. 657-668.
E. Ebrahimi et al, "Fairness via Source Throttling: A Configurable and High-Performance Fairness Substrate for Multi-Core Memory Systems" *ASPLOS'10*, Mar. 13-17, 2010, 12 pages.
M.K. Jeong et al, "A QoS-Aware Memory Controller for Dynamically Balancing GPU and CPU Bandwidth Use in an MPSoC" *DAC 2012*, Jun. 3-7, 2012, pp. 850-855.
B. Li et al, "CoQoS: Coordinating QoS-aware shared resources in NoC-based SoCs" *Journal of Parallel and Distributed Computing*, vol. 70, No. 5, May 2011, 14 pages.
S.P. Muralidhara et al, "Reducing Memory Interference in Multicore Systems via Application-Aware Memory Channel Partitioning" *MICRO 11*, Dec. 3-7, 2011, pp. 374-385.
V. Nagarajan et al, "ECMon: Exposing Cache Events for Monitoring" *ISCA'09*, Jun. 20-24, 2009, 12 pages.
K.J. Nesbit et al, "Fair Queuing Memory Systems" *Proceedings of the 39th Annual IEEE/ACM International Symposium on Microarchitecture*, Dec. 9-13, 2006, 12 pages.
A. Sharifi et al, "METE: Meeting End-to-End QoS in Multicores through System-Wide Resource Management" *SIGMETRICS'11*, Jun. 7-11, 2011, pp. 13-24.
Y. Watanabe et al, "WiDGET: Wisconsin Decoupled Grid Execution Tiles" *ISCA'10*, Jun. 19-23, 2010, pp. 1-12.
C. Kim et al, "Composable Lightweight Processors" *40th IEEE/ACM International Symposium on Microarchitecture*, Dec. 1-5, 2007, pp. 381-394.
E. Ipek et al, "Core Fusion: Accommodating Software Diversity in Chip Multiprocessors" *ISCA'07*, Jun. 9-13, 2007, 12 pages.
M. Boyer et al, "Federation: Boosting Per-Thread Performance of Throughput-Oriented Manycore Architectures" *ACM Transactions on Architectures and Code Optimization*, Dec. 2010, pp. 1-35.
Y. Zhou et al, "The Sharing Architecture: Sub-Core Configurability for IaaS Clouds" *ASPLOS'14*, Mar. 1-5, 2014, 16 pages.
Y. Zhou et al, "Cash: Supporting IaaS Customers with a Sub-core Configurable Architecture" *Proceedings of the 43rd International Symposium on Computer Architecture*, Jun. 18-22, 2016, 13 pages.
M.B. Taylor et al, "The Raw Microprocessor: A Computational Fabric for Software Circuits and General-Purpose Programs" *IEEE Micro*, vol. 22, No. 2, Mar.-Apr. 2002, pp. 25-35.
D. Wentzlaff et al, "On-Chip Interconnection Architecture of the Tile Processor" *IEEE Micro*, vol. 27, No. 5, Sep.-Oct. 2007, pp. 15-31.

\* cited by examiner

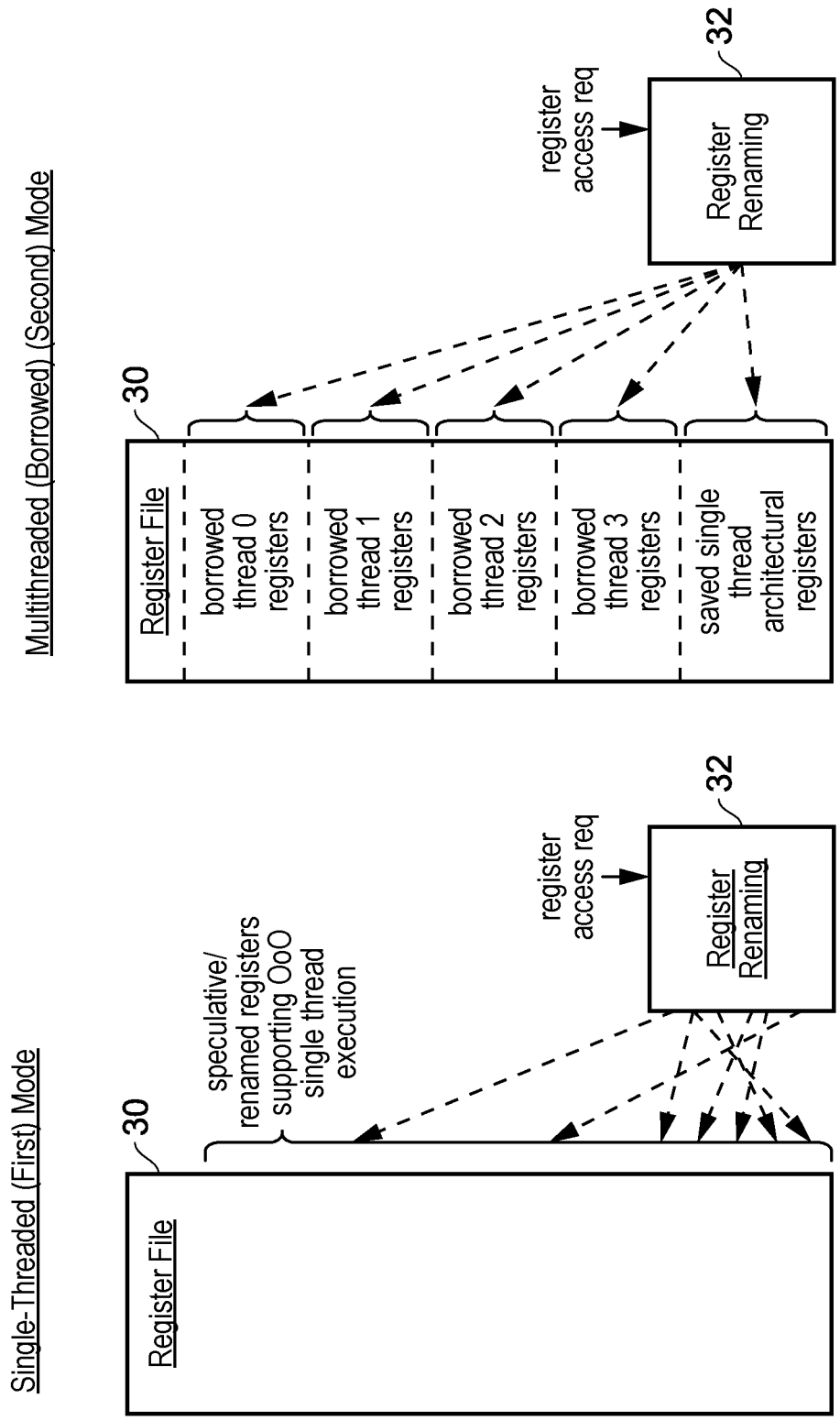

US 10,705,849 B2

MODE-SELECTABLE PROCESSOR FOR EXECUTION OF A SINGLE THREAD IN A FIRST MODE AND PLURAL BORROWED THREADS IN A SECOND MODE

BACKGROUND

Technical Field

This disclosure relates to the field of data processing systems. More particularly, this disclosure relates to a data processing system incorporating multiple processors which cooperate.

It is known to provide data processing systems targeting different performance priorities. For example, if fast execution of a single program thread is desired, then a high performance out-of-order processor may be used to aggressively execute program instructions from the single program thread. Should this single program thread stall, then such a processor may be idle for relatively long periods.

Another type of data processing system may prioritise the overall instruction throughput and utilise multiple program threads executing in parallel in an interleaved fashion. Should an individual thread stall, then it may be swapped for another thread and later restarted when its stalled condition has been removed. Such processors are well suited to non latency critical batch processing applications.

Viewed from one aspect the present disclosure provides apparatus for processing data comprising:
a multithreaded processor to execute in parallel program instructions from a plurality of selected program threads selected from among a queue of a plurality of candidate program threads awaiting execution and managed by said multithreaded processor; and
at least one mode-selectable processor coupled to said multithreaded processor to execute program instructions in a selected mode from among a plurality of modes comprising:
 a first mode in which program instructions from a single program thread are executed; and
 a second mode, selected when said single program thread is inactive, in which program instructions from a plurality of borrowed program threads from said queue are executed in parallel.

Viewed from another aspect the present disclosure provides apparatus for processing data comprising:
multithreaded processing means for executing, in parallel, program instructions from a plurality of selected program threads selected from among a queue of a plurality of candidate program threads awaiting execution and managed by said multithreaded processing means; and
at least one mode-selectable processing means coupled to said multithreaded processing means to execute program instructions in a selected mode from among a plurality of modes comprising:
 a first mode in which program instructions from a single program thread are executed; and
 a second mode, selected when said single program thread is inactive, in which program instructions from a plurality of borrowed program threads from said queue are executed in parallel.

Viewed from another aspect the present disclosure provides A method of processing data comprising:
using a multithreaded processor to execute, in parallel, program instructions from a plurality of selected program threads selected from among a queue of a plurality of candidate program threads awaiting execution and managed by said multithreaded processing means; and
using at least one mode-selectable processor coupled to said multithreaded processor to execute program instructions in a selected mode from among a plurality of modes comprising:
 a first mode in which program instructions from a single program thread are executed; and
 a second mode, selected when said single program thread is inactive, in which program instructions from a plurality of borrowed program threads from said queue are executed in parallel.

Further aspects, features and advantages of the present techniques will be apparent from the following description of examples, which is to be read in conjunction with the accompanying drawings.

BRIEF DESCRIPTION OF THE DRAWINGS

FIG. 2 schematically illustrates the use of a register file in a single-threaded mode;

FIG. 3 schematically illustrates the use of a register file in a multi-threaded mode;

DESCRIPTION OF EXAMPLES

Figure 1:
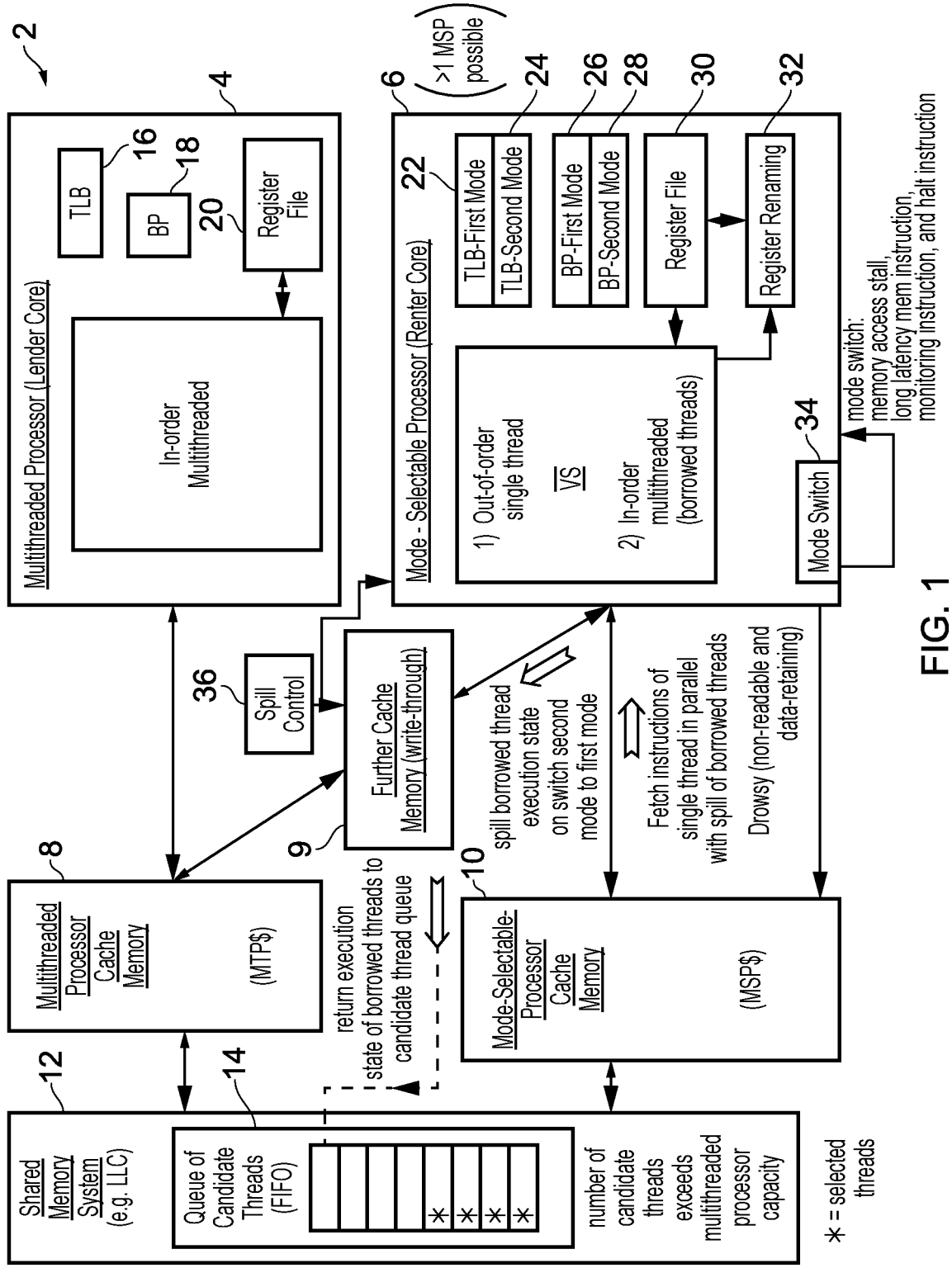
FIG. 1 schematically illustrates a data processing system including a mode-selectable processor which cooperates with a multithreaded processor.

FIG. 1 schematically illustrates a data processing system 2 including a multithreaded processor 4 (which may also be termed a lender core) and a mode-selectable processor 6 (which may also be termed a renter core). The multithreaded processor 4 and the mode-selectable processor 6 cooperate as will be described further below. The memory system of the data processing system 2 includes a multi-threaded-processor cache memory 8, a mode-selectable-processor cache memory 10, a shared memory system 12 (such as a last level cache memory), and a further cache memory 14 disposed in the memory access between the multi-threaded-processor cache memory 8 and the mode-selectable processor 6.

The shared memory system 12 stores a queue of candidate threads 14 primarily for execution by the multithreaded processor 4. The queue of candidate threads is stored as a first-in-first-out memory buffer with the execution state of each candidate thread comprising one entry within this buffer. The multithreaded processor 4 manages the queue of candidate threads 14. The number of candidate threads stored within the queue of candidate threads exceeds the maximum number of selected threads which may be executed at any given time by the multithreaded processor 4. This ensures the multithreaded processor 4 is statistically likely to have a candidate thread available to it for execution should one of its currently selected threads stall. Further-more, as will be described further below, the mode-selectable processor 6 may borrow candidate threads from the queue of candidate threads 14 for execution using the mode-selectable processor 6 should the single thread which is normally executed by that mode-selectable processor be inactive, e.g. stall. The multithreaded processor 4 serves to execute in parallel (i.e. using fine-grained interleaving) program instructions from a plurality of selected program threads from among the queue of candidate threads 14. The multithreaded processor 4 executes each of the selected threads in-order with respect to that thread itself. The multithreaded processor 4 includes functional elements such as a translation lookaside buffer 16, a branch predictor 18 and a register file 20. These functional elements 16, 18, 20 are shared between the plurality of selected threads which are executed at any given time. The multithreaded processor 4 fetches its instructions and data from the multi-threaded-processor cache memory 8. Separate instruction and data caches may be provided in some example embodiments.

The data processing system 2 also includes the mode-selectable processor 6. In the example illustrated in FIG. 1, a single mode-selectable processor 6 is illustrated coupled to cooperating with the multithreaded processor 4. In other examples it is possible that a plurality of mode-selectable processor 6 could be coupled to and cooperate with a given multithreaded processor 4 depending upon the design trade offs and characteristics of the overall processing workload toward which such a data processing system is targeted.

The mode-selectable processor 6 includes a translation lookaside buffer 22 active in a first mode of operation and a translation lookaside buffer 24 active in a second mode of operation. Similarly, the mode-selectable processor 6 includes a branch predictor 26 active in the first mode of operation and a branch predictor active in the second mode of operation. A register file 30 is used during both the first mode of operation and the second mode of operation. Access to the register file 30 is controlled with register renaming circuitry 32, which modifies the way in which the register file 30 is used depending upon whether the mode-selectable processor 6 is executing in the first mode or the second mode.

The first mode of operation of the mode-selectable processor 6 is an out-of-order execution mode targeted at executing a single program thread using aggressive out-of-order techniques, such as speculatively execution and register renaming. The second mode of operation of the mode-selectable processor 6 is an in-order multithreaded mode in which the mode-selectable processor 6 executes borrowed threads drawn from the queue of candidate threads 14 (which is managed by the multi-threaded processor 4) with these being executed in-order with respect to each program thread. The mode-selectable processor 4 switches from the first mode to the second mode under control of mode switching circuitry 34 when a mode switching trigger is detected, such as a memory access stall, execution of a long latency memory access instruction, execution of a monitoring instruction which waits for a predetermined event, or execution of a halt instruction. When such a mode switching trigger occurs, the mode-selectable processor 6 is switched from operating in its first mode of operation to operating in its second mode of operation. When the mode switching trigger is removed, e.g. the memory access is unstalled, the long latency memory access instruction completes, the monitored event occurs, or execution is resumed after a halt instruction, the mode switching circuitry 34 triggers a return from the second mode of processing to the first mode of processing.

In order to reduce the latency associated with switching from the second (multi threaded) mode of operation to the first (single threaded) mode of operation the data processing system 2 of FIG. 1 is arranged such that when operating in its first mode (single threaded) the mode-selectable processor 6 uses its own mode-selectable cache memory 10 for instruction and data accesses. However, when the mode-selectable processor 6 is switched to the second mode, the mode-selectable cache memory 10 is placed into a drowsy state, i.e. a non-readable and data-retaining state in which it consumes a reduced amount of power and retains its contents ready for a rapid restarting of execution of the single thread. Instead of utilizing the mode-selectable processor cache memory 10 during the second (multi threaded) mode of operation of the mode-selectable processor 6, memory accesses are instead made via a further cache memory 9 (operating in a write-through mode) to the multi-threaded-processor cache memory 8. As well as allowing preservation of the cached data for the single thread within the mode selectable processor cache memory 10, use of the multi-threaded-processor cache memory 8 by the multi-selectable processor 6 during the second (multi-threaded) mode permits access to instructions and data for the borrowed threads which may already be present within the multi-threaded-processor cache memory 8 as such threads may previously have been executed by the multithreaded processor 4. As the multi-threaded-processor cache memory 8 may be physically further from the mode-selectable processor 6, and access via multiplexing circuitry, the use of the further cache memory 9 helps to reduce memory access latency when the mode-selectable processor 6 is executing in the second mode.

As well as preserving the cached instructions and data of the single thread within the mode-selectable processor cache memory 10, the provision of a plurality of translation lookaside buffer 22, 24 and a plurality of branch predictors 26, 28 permits the translation lookaside buffer contents (e.g. virtual-to-physical address mappings, memory access permissions, etc.) to be preserved while the provision of multiple branch predictors 26, 28 allows branch predictor state associated with executing the single thread to also be preserved.

Thus, when a switch from the second mode to the first mode is made by the mode-selectable processor 6, then its instruction and data cache content will still be available within the mode-selectable-processor cache memory 10 and the contents of its translation lookaside buffer 22 and branch predictor 26 will similarly have been maintained. The relatively small gate count associated with translation lookaside buffers 22, 24 and branch predictors 26, 28 permits this duplication to be justified by the increase in performance achieved due to preserving the execution state of the single thread enabling a rapid restarting of execution of that single thread with a reduced performance impact thereupon.

When switching from the second mode to the first mode of operation of the mode-selectable processor 6, spill control circuitry 36 serves to save (spill) the borrowed thread execution state for the borrowed threads being executed by the mode-selectable processor 6 into the further cache memory 9. As the further cache memory 9 is a write-through cache no write back of its existing contents is required before saving of the borrowed thread execution states can commence. The borrowed thread execution state data may comprise, for example, the register contents for each borrowed thread at the point in its execution at which the switch from the second mode to the first mode was made. In parallel with the spilling of the borrowed thread execution state into the further cache memory, the mode-selectable processor 6 may also start to fetch and issue instructions of this single thread read from the mode-selectable-processor cache memory 10 which has been switched out of its drowsy state such that it is now readable. These fetched and issued single thread program instructions await execution until the spill of the borrowed thread execution state has completed.

The use of the further cache memory 9 into which to spill the borrowed thread execution state allows the mode-selectable processor 6 to rapidly resume execution of the single thread in an out-of-order manner in accordance with the first mode of operation. The spill control circuitry 36 may subsequently return the borrowed thread execution states from the further cache memory 9 to the queue of candidate threads 14. These borrowed threads may then be rescheduled for execution by the multithreaded processor 4 in the normal way, or even borrowed again later by the mode-selectable processor 6 should it again switch to its second mode of operation.

FIG. 2 schematically illustrates use of the register file 30 by the mode-selectable processor 6 during the single-threaded (first) mode. In this mode the register file 30 supports speculative execution of program instructions from the single thread in an out-of-order manner using register renaming and speculative processing in accordance with techniques associated with aggressive out-of-order program execution. The register renaming circuitry 32 is responsible for managing the mapping between architectural and speculative registers within the register file 30.

FIG. 3 schematically illustrates the use of the register file 30 when the mode-selectable processor 6 is executing in a multithreaded (second) mode. In this mode of operation the registry renaming circuitry 32 serves to store the single threaded architectural registers corresponding to the point of execution reached in the single thread which was halted before switching to the second mode. These saved architectural register values are illustrated in FIG. 3 as stored together within a contiguous region of the register file 30, but in practice they could be distributed in their original positions throughout the register file 30 rather than being moved into new positions in which they are grouped together. The register renaming circuitry 32 further serves to allocate a plurality of architectural registers for use by the respective borrowed threads which are executed in parallel (interleaved) by the mode-selectable processor 6 when executing in the second mode. Again, while FIG. 3 illustrates these borrowed thread registers as grouped together they may in practice be inter-mixed.

Figure 4:
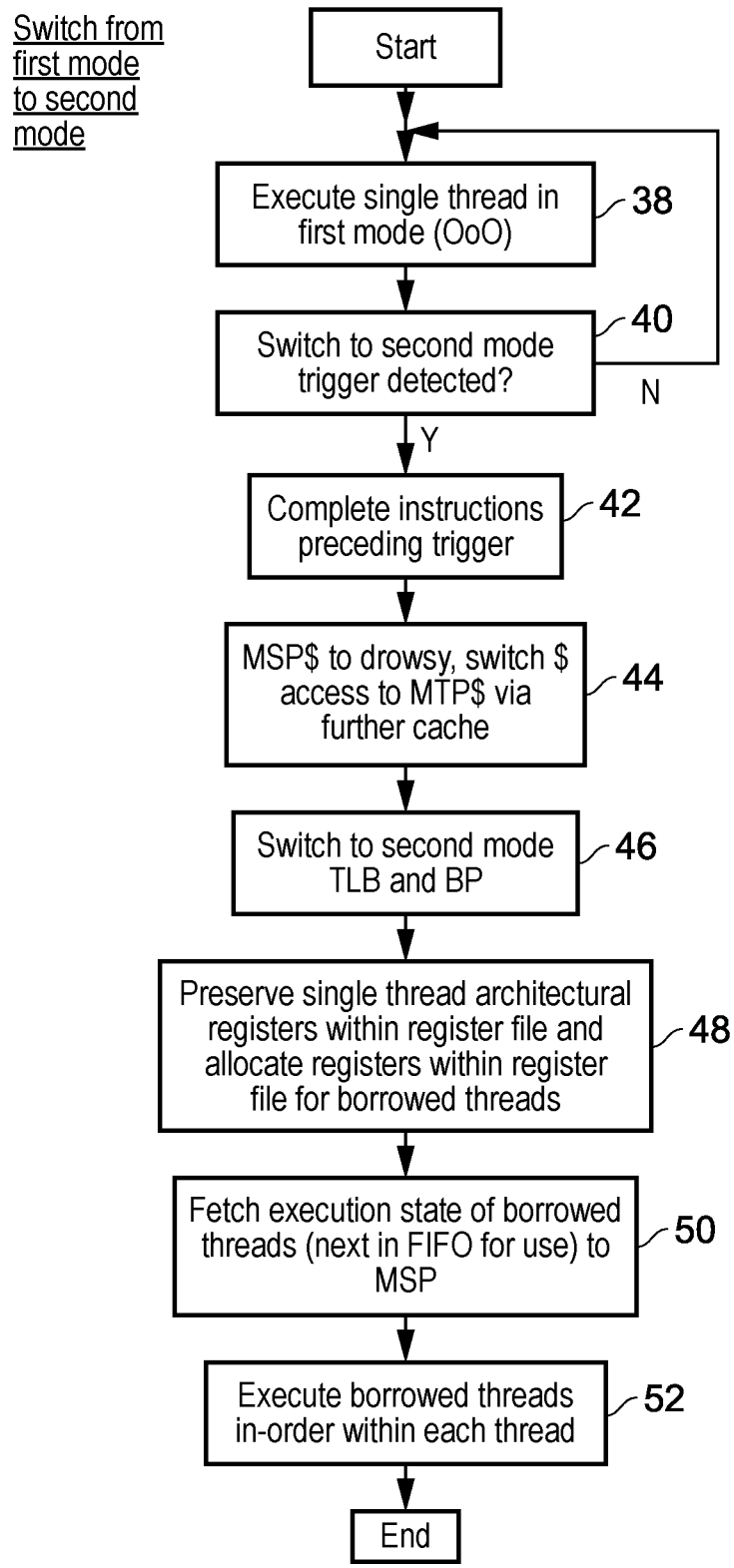
FIG. 4 is a flow diagram schematically illustrating the switch of the mode-selectable processor from a first mode to a second mode.

FIG. 4 is a flow diagram schematically illustrating a switch from the first mode to the second mode by the mode-selectable processor 8. At step 38 the single thread is executed in the first mode using out-of-order techniques. Step 40 determines whether a trigger is detected corresponding to a requirement to switch from the first mode to the second mode. If such a trigger is not detected, then execution of the single thread continues at step 38. When such a trigger is detected, step 42 serves to complete execution of program instructions within the single thread which precede the trigger event within the program order (note that out-of-order execution may have resulted in a different actual order of execution). Program instructions of the single thread following the trigger point are quashed.

Step 44 serves to switch the mode-selectable-processor cache 10 to a drowsy state (non-readable, data-retaining, low power) and switches cache access by the mode-selectable processor 6 to be made to the multi-threaded-processor cache 8 via the further cache 9. Step 46 switches from using the first mode translation lookaside buffer 22 and the first mode branch predictor to instead use the second mode translation lookaside buffer 24 and the second mode branch predictor 28. Step 48 preserves the single thread architectural registers within the register file 30 and allocates other registers within the register file 30 to serve as the architectural register for the borrowed threads to be fetched and executed from the queue 14 by the mode-selectable processor 6. Step 50 fetches the execution state of the borrowed threads (the next in line to be executed within the queue 14 are selected first). Step 52 then executes borrowed threads in-order with respect to each thread with multiple such borrowed threads executing in parallel.

Figure 5:
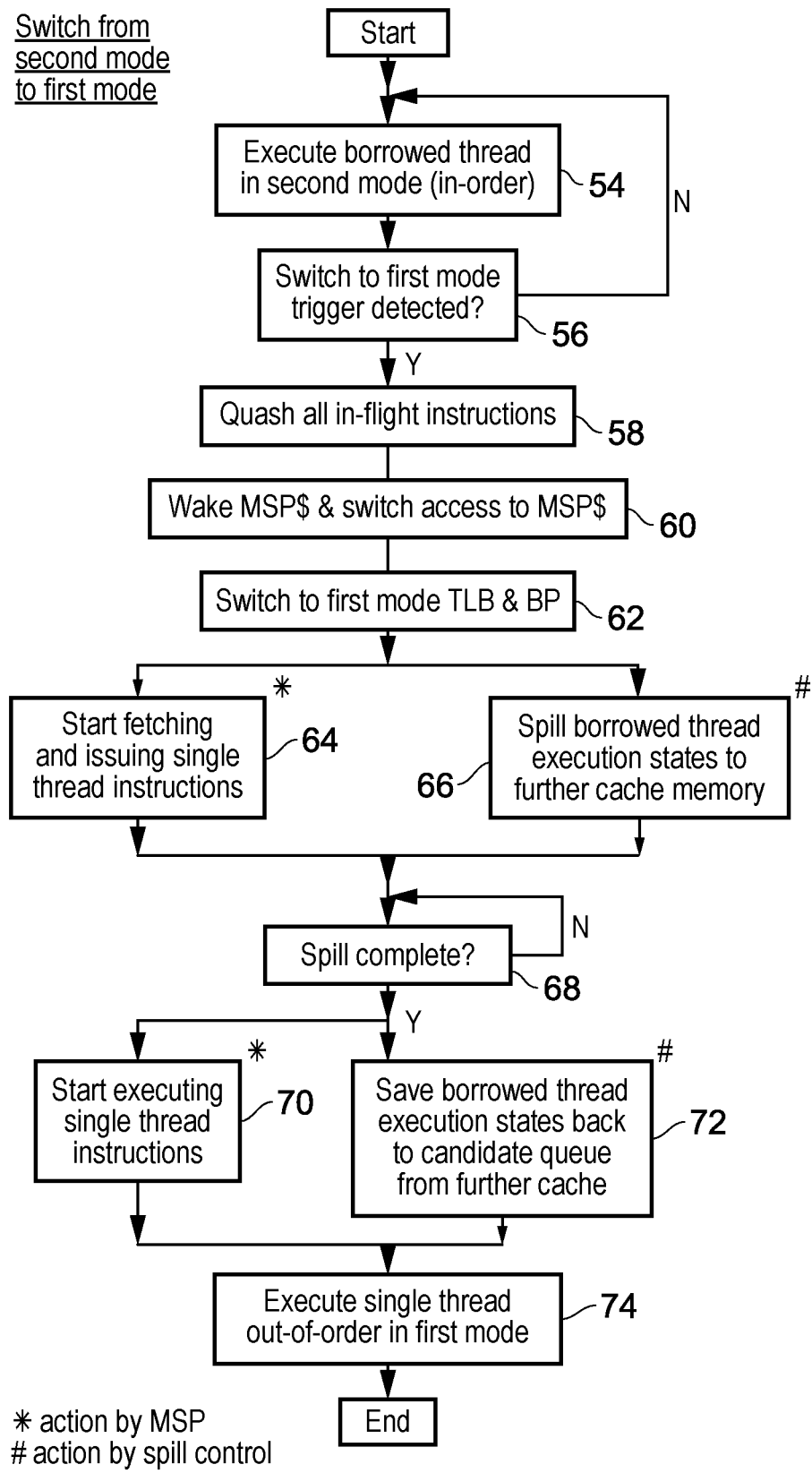
FIG. 5 is a flow diagram schematically illustrating the switch of the mode-selectable processor from a second mode to the first mode.

FIG. 5 is a flow diagram schematically illustrating a switch from the second mode to the first mode by the mode-selectable processor 6. At step 54 the borrowed threads are executed in parallel. At step 56 a determination is made as to whether a trigger has been detected for a switch to the first mode. Such a trigger may be as previously discussed the unstalling of a memory access, the completion of execution of a long latency memory access request, the detection of a predetermined event being monitored by a monitor instruction, or the restarting of execution following a halt instruction.

When such a trigger for a switch to the first mode is detected at step 56, then step 58 serves to quash the execution of all in-flight instructions of the borrowed threads within the mode-selectable processor 6. Step 60 then wakes the mode-selectable processor cache 10 from the drowsy state into the normal state in which it is readable. Step 62 switches the mode-selectable processor 6 to use the first mode translation lookaside buffer 22 and the first mode branch predictor 26.

Steps 64 and 66 are performed in parallel. The spill control circuitry 36 serves to spill (save) borrowed thread execution state data from the mode-selectable processor 6 to the further cache memory 9 at step 66. Such execution state data may include, for example, the architectural registers associated with the points of execution reached by each borrowed thread. In parallel with step 66, step 64 serves to start fetching an issuing program instructions of the single thread from the mode-selectable processor cache memory 10.

Step 68 determines when the spill off the borrowed thread execution state has been completed. When this spill to the further cache memory 9 has been completed, steps 70 and 72 may be performed in parallel. At step 72 the spill control circuitry 36 serves to save the borrowed thread execution state data back from the further cache memory 9 to the queue of candidate threads 14 within the shared memory 12. In parallel with step 72, step 70 serves to start execution of the single thread program instructions by the mode-selectable processor 6. Step 74 continues execution of the single thread out-of-order program instructions in the first mode by the mode-selectable processor 6.

A further description of the present techniques is given below.

Killer microseconds refer to microsecond scale holes in CPU schedules caused by, for example, stalls to access fast I/O devices, or brief idle times between requests in high throughput micro-services. Whereas modern computing platforms can efficiently hide ns-scale and ms-scale stalls through micro-architectural techniques and OS context switching, they lack efficient support to hide the latency of us-scale stalls. Simultaneous Multithreading (SMT) is an efficient way to improve core utilization and increase server performance density. Unfortunately, scaling SMT to provision enough threads to hide frequent killer-microsecond stalls is prohibitive.

In an example a heterogeneous server architecture may employ aggressive multithreading to hide the latency of killer microseconds. Duplexes of two kinds of cores may be provisioned: renter-cores, which primarily execute a latency-critical landlord thread, and lender-cores, which multiplex latency-insensitive throughput threads. When the landlord thread stalls, the renter core "rents" execution contexts from the lender-core, filling killer-microsecond utilization holes. Mechanisms to facilitate thread renting, while protecting landlord thread state from disruption, and avoiding quality-of-service violations, may be used.

An example of a server architecture that seeks directly to address the killer-microsecond challenge—to fill in the microsecond-scale "holes" in threads' execution schedules, which arise due to idleness and stalls, with useful execution, and without impacting the tail latency of latency-critical threads—is described herein. In one embodiment the heterogeneous server architecture that comprises two kinds of cores as described above: renter-cores—targeting latency-sensitive micro-services; and lender-cores—targeting throughput applications. These may be arranged in pairs called duplexes. In an embodiment killer microsecond stalls are addressed by allowing renter-cores to "rent" threads from the lender-core in their duplexes. In an example the renter cores switch between a single-threaded dynamically scheduled execution mode (when running its latency-critical landlord thread) and a multi-threaded mode with in-order issue per thread (to fill in idle/stall periods with rented threads). In an embodiment landlord micro-architectural state may be protected to maintain its QoS—e.g. rented threads do not disrupt the caches, branch predictor, and other state held by the landlord thread. When landlord thread becomes ready, the heterogeneous architecture may rapidly evict rented threads and grant the landlord exclusive use of its core. In one embodiment lender-cores maintain a backlog of virtual contexts, which time-multiplex the lender-core's physical hardware contexts, from which the renter-core may "rent".

In some embodiments the renter threads may be prevented from polluting the landlord thread's caches, in order to reduce resource contention and QoS violations on the landlord thread.

Software/OS-based multi-threading is one approach for hiding millisecond-scale I/O stalls and improving resource utilization when a thread is blocked or idle for lack of work. However, software multi-threading is too coarse-grained to react at the micro-second timescales of micro-services.

In an example lender-cores may maintain a backlog of throughput threads that time-multiplex hardware contexts, from which the renter-core may "rent".

To facilitate thread renting, renter-cores feature two operating modes. When executing the landlord thread, the core operates as an N-way out-of-order processor, with execution resources dedicated to performance. However, whenever the landlord thread becomes idle, or incurs a microsecond-scale stall, the cores "morphing" feature, which partitions the issue queue and register file and deactivates out-of-order issue logic to instead support in-order issue of multiple rented threads, may be activated. The renter-core then loads register state for these rented threads from the lender-core's scheduling backlog and begins their execution. When the landlord thread returns (e.g. stall resolves or new work arrives), it evicts the rented threads, using hardware mechanisms that evacuate their register state as fast as possible. Rented threads do not disrupt the cache state of the landlord thread. In an example a path from the renter-core's memory stage to the lender-core's caches is provisioned; rented threads access the memory hierarchy of the lender-core. Hence, when the landlord returns, there is little evidence the rented threads were ever there.

In an example the goals of lender-cores include: (1) support efficient Simultaneous Multithreading for latency-insensitive workloads that nonetheless incur killer microsecond stalls, and (2) lend threads to the renter-core while it is stalling. One possible way of hiding killer microsecond stalls is to provision more threads from which the lender-core can schedule. However the hardware support for simultaneous execution does not scale well, because the microarchitectural costs (e.g., register file capacity, lower frequency) are high. Second, if too many threads are co-scheduled, they will thrash the L1 caches.

Simultaneous Multithreading (SMT), wherein each core multiplexes instructions from multiple hardware contexts, can increase instruction throughput and improve resource utilization. Unfortunately, the number of SMT threads supported by contemporary processors (typically, 2-4), is far too few to effectively hide frequent us-scale stalls.

Balanced multithreading (BMT) offers a solution to enable a core that can schedule among many threads, but avoids both the microarchitectural and thrashing problems of naively scaling SMT. A BMT core schedules across two levels of threads, referred to as physical and virtual contexts. The BMT core may fetch and issue instructions from threads occupying physical contexts. Threads in a virtual context are swapped into a physical context (displacing another thread) before they may execute.

The BMT core datapath resembles an SMT core that supports as many threads as BMT physical contexts, and has similar area costs and clock frequency. When a thread occupying a physical context stalls, its architectural state (program counter, registers, etc.) is swapped to a dedicated memory region. Then, a ready virtual thread is loaded into the physical context and may immediately begin execution, improving the BMT cores throughput and efficiency.

BMT was originally proposed for OoO SMT execution. In the context of a lender-core, where latency-insensitive threads are targeted, OoO execution is not needed. Because it required few virtual threads, the original BMT proposal fixed the number of virtual contexts. For a lender-core, the required backlog of virtual contexts may depend on the frequency and duration of microsecond-scale stalls, so the BMT hardware may be enhanced to support a variable number of virtual context.

In an example, the lender-core may be designed to exploit the BMT contexts to keep eight in-order physical contexts busy. In an example an analytic model may be used to determine how many virtual contexts are needed to fill eight physical contexts as a function of the fraction of time each virtual thread is stalled. Assuming each virtual thread is stalled for a fraction of time p, the distribution of ready threads is then given by a Binomial k~Binomial(n, 1−p), where k represents the number of ready threads, n the number of virtual contexts and p the probability a thread is stalled. In an example where threads are stalled only 10% of the time, 11 virtual contexts are sufficient to keep the 8 physical contexts 90% utilized. However, in an example with 50% stalls, 21 virtual contexts are needed.

Figure 6:
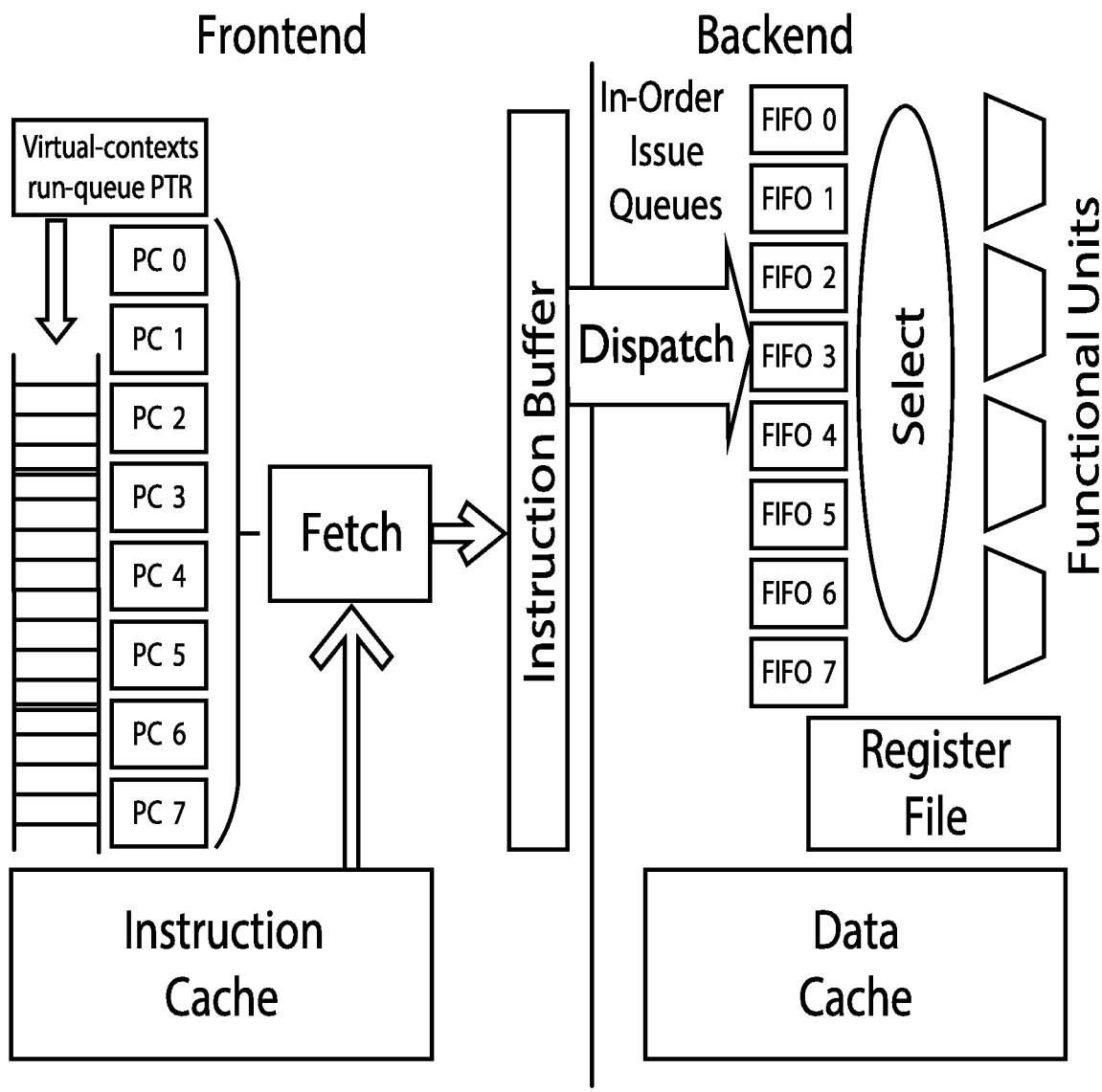
FIG. 6 schematically illustrates an 8-way-in-order lender core with eBMT.

In some embodiments a core built in accordance with the described heterogeneous architecture may be simple and area-efficient (e.g. see FIG. 6), since it does not require any OoO execution logic. The eBMT frontend maintains a pointer to a FIFO run queue in dedicated memory, which holds the state of the virtual contexts. When a physical context stalls or becomes idle, the frontend hardware executes microcode that dumps the context of the stalled thread to the tail of the run queue. Then, it loads the architectural state from the head, which begins executing. The length of the run queue is not limited by hardware. OS- or cluster-level scheduling frameworks may provision sufficient threads to each lender core such that the core is fully utilized and threads do not starve.

In an embodiment renter cores rent threads from a lender core by stealing a virtual context from the head of its run queue. A renter core and a lender core share the dedicated memory region where virtual contexts are stored.

In some embodiments co-running additional threads alongside a latency-sensitive thread can harm tail latency. In the microsecond regime, where threads stall frequently, SMT provides a promising approach to recover lost cycles, especially for latency-insensitive applications.

In one embodiment the system executes the landlord thread by itself, to preserve its tail latency, but multiplex several rented threads during landlord-thread stalls, to recover throughput. In landlord-thread mode, the renter-core operates as a single-threaded 4-wide out-of-order superscalar core, targeting single-thread performance and low tail latency. In rented-thread mode, while the landlord thread is stalled/idle, the renter-core switches from its single-threaded out-of-order issue mechanism to the eBMT mechanism of a lender-core. It then multiplexes multiple rented threads to use the available issue bandwidth. Together, these two modes may increase performance density and energy efficiency by increasing the number of executed instructions.

The rented threads may thrash the landlord's state. A simple solution is to replicate all stateful micro-architectural structures (register files, caches, branch predictor, TLBs, etc.), segregating rented thread state from landlord-thread state. However, caches and register are large and power-hungry. In some embodiments the area-inexpensive structures, like TLBs and branch predictors may be the only structures replicated. A full size TLB and reduced size branch predictor for exclusive use by rented threads may be provisioned. For the register file, empty physical registers to store the architectural state of rented threads may be provisioned, using the renaming logic to track the assignment of logical rented-thread registers to physical registers. Once its in-flight instructions are squashed or drained, the landlord thread occupies only enough physical registers to maintain its architectural state.

Figure 7:
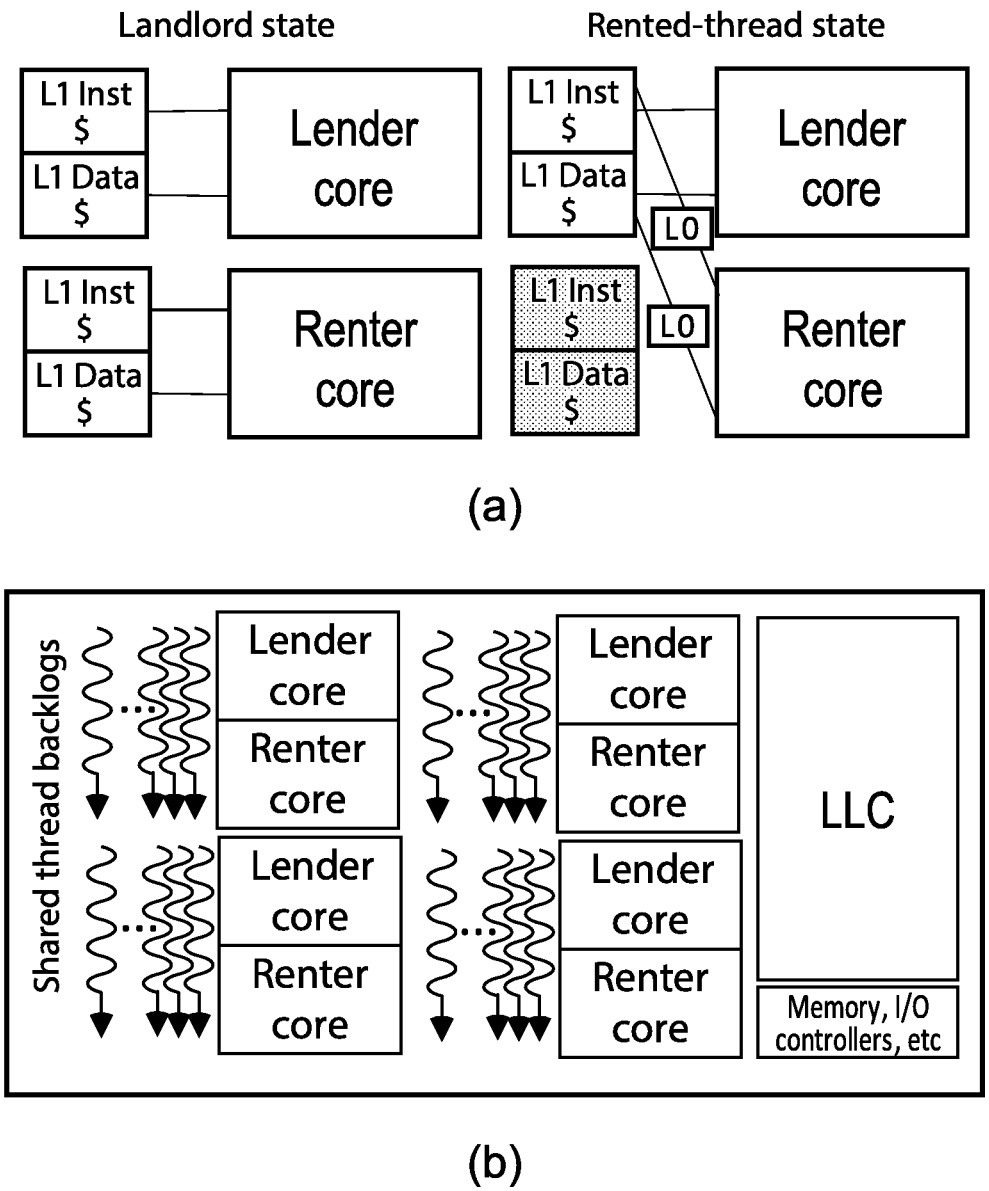
FIG. 7 schematically illustrates (a) a duplex composed of an renter and a lender core, and (b) a layout of a server processor chip.

In some embodiments, instead of replicating caches, a renter-core may be paired with a lender-core to form a duplex. When a renter-core morphs into rented-thread mode, the rented threads remotely access the L1 instruction and data caches of the lender-core. The duplex provides data paths from the renter-core's fetch and memory units to the lender-core's caches, as shown in FIG. 7(a). This approach may: (1) protect the landlord thread's state; and (2) allow rented threads to hit on their own cache state if they migrate between the renter-core and lender-core. However, (1) The L1 access latency of rented threads on the renter-core may be higher than local cache access in either core; and (2) the capacity pressure and bandwidth requirements on the lender-core's caches increase, since both cores may access it. In some embodiments a small L0 I-cache and a L0 write-through D-cache (for example 2 KB and 4 KB respectively) may be introduced in the renter-core for accesses to the lender-core's L1 caches. Although these L0 caches have low hit rates, they are still effective bandwidth filters and service many sequential accesses, especially for instructions. Although capacity pressure on the lender-core's L1 cache is high, eBMT is inherently latency tolerant.

The landlord should be able resume execution quickly when it is ready. Several approaches may be used to accelerate restart. In one example the L0 data cache may be reused to accelerate spilling the architectural state of rented threads. The L0 cache may be writeback, hence, its contents can be discarded or over-written at any time. When the landlord thread becomes ready, all pending rented-thread instructions can be immediately flushed. Then, some or all read ports on the physical register file are used to extract rented thread architectural states, which are aligned/packed and written to the L0 data cache. In an example, with eight register file read ports and an L0 write bandwidth of one cache line per cycle, it may take less than 50 cycles to spill the rented threads. In an example each thread may require a total of 16 integer and 16 floating-point/SIMD registers, per the x86 ISA, for its architectural state. In an example the renter-core's physical register files include 144 registers, which is sufficient for nine threads (the landlord and eight rented threads). In the above example the L0 capacity is sufficient to absorb the spill of all rented-thread registers. During the spill, the renter-core can begin fetching and dispatching landlord-thread instructions. (Note that landlord instructions may not issue until read ports become available). As the landlord's cache state is intact, fetches are likely to hit. In an example the landlord's thread architectural state is already present in the physical register file, it is not evicted. In an example, the rented-thread state is drained from the L0 to the dedicated backing store in the background. In one example, there may be a 50-cycle delay to resume landlord execution.

In one embodiment an integrated circuit may comprise several duplexes each with a lender-core and renter-core that share a pool of virtual contexts, e.g. see FIG. 7(b). In an example the lender-core may leverage the eBMT technique with 8 physical contexts sharing an 8-way in-order data path. The eBMT technique may enable the lender-core to hide killer microsecond stalls in its latency-insensitive virtual context pool. The renter-core may fill its killer microsecond stalls with rented threads by morphing to eBMT behavior in rented mode, while still protecting the landlord-thread from tail latency disruption. Sharing the virtual context pool across the duplex may prevent virtual contexts from starving; they will eventually get an opportunity to run on the lender-core.

In an example an operating system can schedule latency-critical threads to execute as landlord threads on renter-cores. The OS can also provision threads to fill the virtual contexts in each duplex. Since the number of virtual contexts is variable, and may be tuned based on the frequency and duration of killer microsecond stalls, a duplex appears to software as if it supported a variable number of hardware threads. The OS may require support to configure and populate each duplex's virtual contexts. The scheduling of virtual contexts on the physical contexts of renter-cores and lender-cores is transparent to software. The renter-core may be exposed to software as a single-threaded core, while virtual contexts belonging to a duplex are viewed as belonging to the lender-core. In existing OSs, CPU hot-plug mechanisms may be applicable to vary the number of virtual contexts in a duplex at runtime.

An operating system may select how many virtual contexts to activate in a duplex. One option is to simply provision a large number of virtual contexts, but this may lead to long delays for ready virtual contexts to be scheduled. Alternatively, a data-center-scale scheduling layer might perform a data-center-wide at least partial optimization to assign threads to duplexes across multiple servers.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
 a multithreaded processor to execute, in parallel, program instructions from a plurality of selected program threads selected from among a queue of a plurality of candidate program threads awaiting execution and managed by said multithreaded processor; and
 a mode-selectable processor coupled to said multithreaded processor to execute program instructions in a selected mode from among a plurality of modes comprising:
 a first mode in which program instructions from a single program thread are executed; and
 a second mode, selected when said single program thread is inactive, in which program instructions from a plurality of borrowed program threads from said queue are executed in parallel,
 wherein said multithreaded processor comprises a multithreaded-processor cache memory, said mode-selectable processor comprises a mode-selectable-processor cache memory, and said mode-selectable processor is configured to switch from using said mode-selectable-processor cache memory when operating in said first mode to using said multithreaded-processor cache memory when operating in said second mode.

2. Apparatus as claimed in claim 1, wherein, when operating in said first mode, said mode-selectable processor supports out-of-order execution of program instructions from said single program thread.

3. Apparatus as claimed in claim 1, wherein, when operating in said second mode, said mode-selectable processor executes in-order, within each thread, said program instructions from said plurality of borrowed program threads.

4. Apparatus as claimed in claim 1, wherein said mode-selectable processor switches said mode-selectable-processor cache memory into a non-readable data-retaining state when operating in said second mode.

5. Apparatus as claimed in claim 4, comprising a further cache memory disposed between said multithreaded-processor cache memory and said mode-selectable processor.

6. Apparatus as claimed in claim 5, wherein said further cache memory comprises a write-through data cache memory.

7. Apparatus as claimed in claim 5, wherein, when switching from said second mode to said first mode, said mode-selectable processor stores to said further cache memory execution state data defining current execution states of said plurality of borrowed program threads.

8. Apparatus as claimed in claim 7, wherein at least fetching of program instructions of said single program thread is performed in parallel with said storing of said execution state data to said further cache memory.

9. Apparatus as claimed in claim 7, wherein said execution state data is transferred from said further cache memory to said queue of candidate program threads.

10. Apparatus as claimed in claim 1, wherein said mode-selectable processor comprises a register file to store register values, and, when operating in said second mode, said register values corresponding to an execution state of said single program thread are maintained within a first portion of said register file with a second portion of said register file used to store register values for said plurality of borrowed threads.

11. Apparatus as claimed in claim 10, wherein said mode-selectable processor comprises register renaming circuitry to track register renaming of said register file during out-of-order execution of said single program thread when operating in said first mode and to track allocation of registers of said register file to respective ones of said plurality of borrowed threads when operating in said second mode.

12. Apparatus as claimed in claim 1, wherein said mode-selectable processor comprises a first translation lookaside buffer for use in said first mode and a second translation lookaside buffer for use in said second mode.

13. Apparatus as claimed in claim 1, wherein said mode-selectable processor comprises a first branch predictor for use in said first mode and a second branch predictor for use in said second mode.

14. Apparatus as claimed in claim 1, wherein said single program thread becomes inactive in response to one or more of:
 a memory access stall;
 execution of a long-latency memory access instruction;
 execution of a monitoring instruction waiting for detection of a predetermined event; and
 execution of a halt instruction.

15. Apparatus as claimed in claim 1, wherein, when switching from said first mode to said second mode at a point within said single program thread corresponding to a last active instruction, said mode-selectable processor completes execution of program instructions within said single program thread preceding said last active instruction and quashes processing of any program instructions following said last active instruction.

16. Apparatus as claimed in claim 1, wherein when switching from said second mode to said first mode, said mode-selectable processor quashes all in-flight program instructions of said plurality of borrowed threads.

17. Apparatus as claimed in claim 1, wherein said queue of said plurality of candidate program threads stores execution context data for each of said plurality of candidate program threads and is accessed as a first-in-first-out buffer within a memory address space of said apparatus.

18. Apparatus as claimed in claim 1, wherein said plurality of candidate program threads exceed in number a maximum number of selected program threads that are executed in parallel by said multithreaded processor.

19. Apparatus for processing data comprising:
 multithreaded processing means for executing, in parallel, program instructions from a plurality of selected program threads selected from among a queue of a plurality of candidate program threads awaiting execution and managed by said multithreaded processing means; and a mode-selectable processing means coupled to said multithreaded processing means to execute program instructions in a selected mode from among a plurality of modes comprising:

a first mode in which program instructions from a single program thread are executed; and a second mode, selected when said single program thread is inactive, in which program instructions from a plurality of borrowed program threads from said queue are executed in parallel, wherein said multithreaded processing means comprises a multithreaded-processor cache means, said mode-selectable processing means comprises a mode-selectable-processor cache memory, and said mode-selectable processing means is configured to switch from using said mode-selectable-processor cache means when operating in said first mode to using said multithreaded-processor cache means when operating in said second mode.

20. A method of processing data comprising:

using a multithreaded processor to execute, in parallel, program instructions from a plurality of selected program threads selected from among a queue of a plurality of candidate program threads awaiting execution and managed by said multithreaded processor; and using a mode-selectable processor coupled to said multithreaded processor to execute program instructions in a selected mode from among a plurality of modes comprising:

a first mode in which program instructions from a single program thread are executed; and a second mode, selected when said single program thread is inactive, in which program instructions from a plurality of borrowed program threads from said queue are executed in parallel, wherein said multithreaded processor comprises a multithreaded-processor cache memory, said mode-selectable processor comprises a mode-selectable-processor cache memory, and said mode-selectable processor switches from using said mode-selectable-processor cache memory when operating in said first mode to using said multithreaded-processor cache memory when operating in said second mode.

* * * * *